United States Patent [19]

Gernon

[11] Patent Number: 5,520,794
[45] Date of Patent: May 28, 1996

[54] ELECTROWINNING OF LEAD

[75] Inventor: Michael D. Gernon, Upper Providence, Pa.

[73] Assignee: Elf Atochem North America, Inc., Philadelphia, Pa.

[21] Appl. No.: 440,606

[22] Filed: May 15, 1995

[51] Int. Cl.$^6$ ............................................. C25C 1/14
[52] U.S. Cl. .............................. 205/598; 205/601
[58] Field of Search .......................... 205/254, 299; 204/114, 119, 115, 116, 117

[56] References Cited

U.S. PATENT DOCUMENTS

| | | | |
|---|---|---|---|
| 2,525,942 | 10/1950 | Proell | 205/263 |
| 4,229,271 | 10/1980 | Prengaman et al. | 204/114 |
| 4,272,340 | 6/1981 | Cole, Jr. et al. | 204/114 |
| 4,650,553 | 3/1987 | Felgendreger | 204/114 |
| 4,662,999 | 5/1987 | Opaskar | 205/254 |
| 4,769,116 | 9/1988 | Olper et al. | 204/114 |
| 4,925,543 | 5/1990 | Ginatta | 204/288 |
| 4,927,510 | 5/1990 | Olper | 204/114 |
| 4,994,155 | 2/1991 | Toben | 205/140 |
| 5,262,020 | 11/1993 | Masante | 204/114 |
| 5,344,530 | 9/1994 | de Nora et al. | 204/114 |

*Primary Examiner*—John Niebling
*Assistant Examiner*—Brendan Mee

[57] ABSTRACT

An electrowinning process for lead incorporating a variety of alkanesulfonic acid-based electrolytes in the absence of a redox couple, is disclosed; an inert anode and a lead accepting cathode are utilized.

15 Claims, No Drawings

ELECTROWINNING OF LEAD

BACKGROUND OF THE INVENTION

This invention relates to the recovery of lead from scrap, from its ore or from compounds thereof wherein the lead, or a soluble compound thereof, is dissolved in an aqueous alkanesulfonic acid and recovered by electrolysis at a lead receptive cathode. More particularly, it involves the electrowinning reduction of lead salts to metallic lead from an electrolyte solution comprising dissolved lead sulfonate and an alkanesulfonic acid.

The net production of metal by electrolysis is known as electrowinning. Electrowinning is carried out by passing a direct electric current through a solution of a reducible metal salt. Zero-valent metal is electrodeposited on the cell cathode while some anodic process, usually oxygen formation, is caused to occur on a couple inert anode. Electrowinning processes are distinct from electroplating processes in that the primary object of electrowinning is to recover metal by net depletion of dissolved metal salts. In electroplating, the primary object of the process is to produce a desirable (e.g., protective or decorative) metal coating, and, for convenience, electroplating processes often employ dissolving metal anodes with compositions similar to that of the metal being electrodeposited. In electrowinning, where, by definition, there is net conversion of dissolved metal salts to zero-valent metal, an inert anode must be used.

THE PRIOR ART

Electrolytic lead recovery methods based on aqueous fluoboric acid electrolytes (e.g., U.S. Pat. Nos. 5,262,020 & 4,927,510) and aqueous fluosilicic acid electrolytes (e.g., U.S. Pat. No. 4,927,510) have been described.

The use of lead sulfonate salts and aqueous sulfonic acid electrolytes for the electrodeposition of lead and lead alloys has been described in the literature (see e.g., Rosenstein, C.: *Metal Finishing*, 1990, 17–21). The very high solubility of certain lead sulfonate salts in aqueous solutions [e.g., the methanesulfonate salt of lead (II) is soluble in water to an extent of 500 g/1 as Pb] has been found to be very advantageous in the formulation of lead electroplating solutions. Indeed, the use of aqueous sulfonic acid electrolytes, particularly methanesulfonic acid, in the electrorefining of metallic lead electrodes derived from spent car batteries has been described by Felgendreger et al. (U.S. Pat. No. 4,650,553).

More recently, a process (U.S. Pat. No. 5,262,020) has been reported for the electrowinning of lead from lead salts, in particular processed battery paste, carried out with the use of an acid electrolyte in the presence of a redox couple (to reduce lead dioxide and/or oxidize microparticles of suspended lead metal). The patented process discloses that fluoboric acid, fluosilicic acid, sulfamic acid and $C_1$–$C_4$ alkanesulfonic acids are all useful in the formulation of electrolytes for redox mediated electrowinning of lead, but the unique properties of sulfonic acid electrolytes which allow for safer operation, extended anode life and superior $PbO_2$ morphology in all types of lead electrowinning, including redox couple mediated, were not suggested.

STATEMENT OF THE INVENTION

This invention is a lead recovery process comprising the electrowinning of said lead from an aqueous solution of a lead salt of a $C_1$–$C_6$ alkanesulfonic acid in the absence of a redox couple in said aqueous solution.

DETAILED DESCRIPTION OF THE INVENTION

The process of this invention is for lead recovery from lead containing materials including, for example, man-made lead components of batteries and other apparatus, lead-containing ores and mixtures of lead with other materials. Many ore refining and waste metal recovery processes include steps which produce concentrated solutions of metal salts. For maximum economic gain, the metal salts produced by such refining and recycling operations must be reduced to zero-valent metal. Normally, the reduction can be carried out by either electrolytic or pyrolytic methods, but electrolytic methods are generally found to be superior in terms of energy usage and environmental impact. In this respect, the invention described herein will have general application to all lead refining, mining, recovery and processing operations wherein electrowinning steps are involved.

The process involves the electrowinning of lead dissolved in the form of a salt of a $C_1$–$C_6$ alkanesulfonic acid, preferably methanesulfonic acid, in an aqueous solution of such acid. The passage of a direct electric current through the solution causes zero-valent lead to deposit on the cathode of the electrolytic system. Some anodic action, usually involving the formation of oxygen, occurs on a coupled inert anode of the system.

It has now been found that lead electrowinning electrolytes based on sulfonic acids, particularly methanesulfonic acid, are unexpectedly superior to comparable electrolytes based on aqueous fluoboric acid and/or aqueous fluosilicic acid. The working atmosphere in close proximity to sulfonic acid based electrowinning electrolytes is safer than the working atmosphere near comparable fluoboric acid and/or fluosilicic acid based electrolytes, as the hazards associated with the generation of HF are not present when sulfonic acid electrolytes are used. In addition, the physical state of the lead dioxide ($PbO_2$) which inevitably forms on the surface of the operating inert anode is more often significantly better when aqueous sulfonic acid electrolytes are used in place of comparable aqueous fluoboric acid and/or fluosilicic acid electrolytes.

Previous work (see e.g., U.S. Pat. No. 5,344,530) on robust process and inert anode design for lead electrowinning has centered on optimal electrolytes and anode compositions for aqueous fluoboric acid and aqueous fluosilicic acid electrolytes. Fluoboric acid and fluosilicic acid based systems are generally more corrosive than comparable sulfonic acid based systems, and, in accordance with the present invention, a variety of aqueous sulfonic acid electrolytes are disclosed which allow for significantly improved lead electrowinning processes.

The solvents (electrolytes) employed for the process of this invention are mostly aqueous, but mixtures of water and organic solvents, particularly $C_1$ to $C_4$ alcohols, can also be used. The electrolytes are prepared by the addition of an appropriate amount, usually 5% to 35% by weight, of a prescribed $C_1$–$C_6$ alkane sulfonic acid, preferably methanesulfonic acid, to water followed by the addition of a soluble lead salt and any other additives necessary or desired. The alkane group of the sulfonic acid may be substituted with hydroxyl, alkoxy, keto, carbonyl, carboxyl, sulfenyl, sulfinyl, sulfonyl, nitro, nitroso, azo, amino and/or other heteroatom radicals, and their mixtures.

The soluble lead salt is usually a lead sulfonate which has been prepared by the leaching of lead carbonate, lead oxide, or some other similar basic lead salt. As a matter of convenience, the initial preparation can be carried out by dissolving a measured excess of sulfonic acid in water and then adding a basic lead salt directly to the lead electrowinning electrolyte such that a soluble lead salt is formed in-situ.

Following preparation of the solution of Pb(II) and sulfonic acid in water, other materials, commonly referred to as additives, may be added to the electrolyte to improve various aspects of the overall lead electrowinning process. Additives which have been found to improve the physical state of the electrodeposited lead include: anionic surfactants, cationic surfactants, nonionic surfactants, substituted aromatic hydrocarbons, heteroaromatic compounds and heterocyclic compounds. Phosphorous compounds can be added to improve the efficiency of the anode oxygen evolution process, and, in general, any chemical, other than a redox couple, which may improve some aspect of the electrowinning process can be used as an additive.

The electrolyte is normally prepared in an electrolytic cell fitted with a cathode and an inert anode. The cathode can be composed of any conductive material, but for convenience the cathode is usually 4N lead. The inert anode can be any material which does not primarily dissolve under the conditions of the electrowinning. Oftentimes, the inert anode is designed to promote an oxygen evolution reaction. Carbon based anodes and anodes consisting of metal oxide(s) deposited on conductive supports, e.g., carbon, are commonly used. In addition to the desired anode reaction, normally oxygen evolution, lead dioxide formation and anode dissolution reactions also occur. This invention is unique in that the lead dioxide which is deposited from sulfonic acid electrolytes is generally superior in physical form to the lead dioxide deposited from alternative electrolytes.

The electrolytic cell is normally operated at a current density between 10 amps/sq.ft. (ASF) and 500 ASF with net reduction of dissolved Pb(II) to metallic lead. As the electrowinning electrolyte becomes depleted of Pb(II), additional basic lead salt is added to reestablish an optimum Pb(II) concentration. Acid additions are necessary on an infrequent basis to make up for electrolyte which has been lost from the cell during the removal of spent anodes and fully loaded cathodes ("drag-out"). In addition, some acid must be added to make up for the small inefficiency associated with the anode process, but the anode reactions do normally generate a significant amount of $H^+$.

The process of this invention can be easily integrated into typical electrolytic lead recovery operations. In such operations, the acidic solution (battery paste) Which is dumped from a scrap battery is desulfated by neutralization with a carbonate salt. The carbonated battery paste is treated as a basic lead salt, and the rest of the process is identical to what is described above. Additionally, the above lead electrowinning process can be incorporated into lead ore processing operations and polluted soil remediation activities.

For hydrometallurgical lead recovery, essentially lead electrowinning, to be successful, the process must be automated to reduce labor costs. Furthermore, the process equipment must be relatively long-lived. In a typical lead electrowinning cell, the desired anode process is oxygen evolution, but $PbO_2$ formation and destructive anode dissolution reactions will also occur. Anode replacement costs and operator labor costs associated with cleaning and refurbishing anodes can contribute significantly to the overall cost of a lead electrowinning operation. In addition, problems associated with contamination of the electrowinning electrolyte by dislodged particles of conductive $PbO_2$ can necessitate costly solution cleaning operations.

The physical state of the $PbO_2$ which forms on the surface of an operational lead electrowinning inert anode is influenced by the nature of the electrowinning electrolyte. The $PbO_2$ which can be deposited from many sulfonic acid based electrolytes is hard, shiny and relatively adherent, and such surface adherent $PbO_2$ is generally superior for lead electrowinning.

The following table illustrates the operable and preferred limits for the electrowinning of lead from sulfonic acid based electrolytes;

| Parameter | Operable Limits | | Preferred Limits | |
|---|---|---|---|---|
| | Lower | Upper | Lower | Upper |
| Sulfonic Acid Concentration (wt/wt) | 0% | 100% | 5% | 35% |
| Lead Sulfonate Concentration (g/l as Pb) | 1 | 500 | 50 | 150 |
| Temperature (°C.) | 0 | 110 | 20 | 50 |
| Nonionic Surfactant Concentration (g/l) | 0 | 100 | 1 | 6 |
| Phosphorus Content (g/l) | 0 | 10 | 0 | 2 |
| Current Density (ASF) | 1 | 500 | 20 | 200 |
| Type of Sulfonic Acid | $C_1$ to $C_6$ Alkane (Substituted or Unsubstituted) | | Methanesulfonic Acid | |
| Inert Anode Type | Any | | Carbon based or Metal Oxide Coated | |
| Solution Agitation | None to Vigorous | | Moderate | |

The following examples are set forth to demonstrate this invention.

EXAMPLE 1

A one liter electrolyte was prepared as 100 g/l Pb[II] (from lead methanesulfonate), 200 g/l (18 wt/wt % MSA in water) methanesulfonic acid (Elf Atochem, 1752 grade), and 2 g/l of an ethoxylated $C_{16}$ amine (average ethoxylation content of 25 ethyleneoxy groups per molecule). The electrolyte was transferred to a glass recrystallizing dish which was fitted with a lead cathode (45 cm$^2$) and a lead anode (45 cm2). The inter-electrode gap was 14 cm, and the solution was magnetically stirred (4 cm stir bar, 120 cpm). The solution was electrolyzed at 2 amps (approximately 50 ASF on both anode and cathode) for 24 hours. The current remained stable at 2 amps, and the voltage was stable at 2 volts (i.e., the cell resistance was about 1 ohm). Approximately 7.7 grams of lead, the theoretical amount, was electrodeposited per hour. The above experiment demonstrated the convenience of formulating lead electrowinning solutions with methanesulfonic acid. In particular, the very high solubility of lead methanesulfonate in aqueous solution (approximately 500 g/l as lead) was advantageous.

EXAMPLE 2

Three one liter aqueous electrowinning solutions were prepared as listed in the following table:

| Solution | Acid (g/l) | Lead (g/l as Pb) | $H_3PO_4$ (g/l) |
|---|---|---|---|
| A | 240 g/l | 100 g/l | 0 g/l |
| B | 160 g/l | 100 g/l | 0 g/l |
| C | 160 g/l | 100 g/l | 10 g/l |

The acid of solution A was methanesulfonic acid (1752 grade, Elf Atochem). The acid of solutions B and C was a mixture of 25% $HBF_4$ and 75% $H_2SiF_6$ (by weight). All three solutions contained 4 g/l of an ethoxylated $C_{16}$ amine (see Example 1). The above solutions were poured into recrystallizing dishes (16 cm diameter) which were fitted with a 7 cm×5 cm isotropic polycrystalline graphite (carbon) anode purchased from UNOCAL POCO Graphite, and a lead cathode (9 cm×4 cm). The interelectrode gap was approximately 14 cm. The solutions were magnetically stirred (4 cm long stir bar, 120 cpm). Electrowinning was carried out at 2 amperes (approximately 50 ASF on both cathode and anode). The temperature was stable at 25° C. In all three cases, the cell resistance was approximately 2.5 ohms. The physical properties of the lead dioxide formed on the carbon anode were analyzed after 4 hours of steady electrolysis. In the case of methanesulfonic acid, the $PbO_2$ was smooth, shiny, and sufficiently adherent to produce a very convenient steady-state inert anode. In the case of the fluoboric and fluosilicic acid electrolyte, the $PbO_2$ was porous, rough, and sufficiently non-adherent to produce an inconvenient steady-state anode. It is well known in the art of electrolytic lead recovery that smooth and hard $PbO_2$ coatings are optimal for convenient and economic operation.

I claim:

1. A process for the recovery of lead metal comprising, electrowinning of said lead by utilizing an inert anode and a lead receptive cathode in an aqueous solution of a lead salt of a $C_1$–$C_6$ alkanesulfonic acid, and in the absence of a redox couple in said aqueous solution.

2. The process of claim 1 wherein the $C_1$–$C_6$ alkanesulfonic acid is methanesulfonic acid.

3. The process of claim 1 wherein the $C_1$–$C_6$ alkane group is substituted.

4. The process of claim 3 wherein the $C_1$–$C_6$ alkane group is substituted with a radical selected from those consisting of hydroxyl, alkoxy, keto, carbonyl, carboxyl, sulfenyl, sulfinyl, sulfonyl, nitro, nitroso, azo, amino, and mixtures thereof.

5. The process of claim 1 wherein the inert anode is carbon based.

6. The process of claim 1 wherein the inert anode is metal oxide coated.

7. The process of claim 1 wherein a source of lead for said aqueous solution is a basic lead salt.

8. The process of claim 7 wherein said basic lead salt is lead carbonate.

9. The process of claim 1 wherein a source of lead for said aqueous solution is a lead $C_1$–$C_6$ alkanesulfonate.

10. The process of claim 9 wherein said $C_1$–$C_6$ alkanesulfonate is methanesulfonate.

11. The process of claim 1 wherein at least one additive for improving the quality of the recovered lead is included in said aqueous solution.

12. The process of claim 11 wherein said additive is an anionic, cationic, or nonionic surfactant, or a mixture thereof.

13. The process of claim 11 wherein said additive is a soluble phosphorous compound.

14. The process of claim 8 wherein said $C_1$–$C_6$ alkanesulfonic acid is methanesulfonic acid.

15. The process of claim 1 wherein a source of lead is a basic lead salt which is derived from a spent battery electrolyte.

* * * * *